US007786846B2

(12) United States Patent
Amtmann et al.

(10) Patent No.: US 7,786,846 B2
(45) Date of Patent: Aug. 31, 2010

(54) COMMUNICATION STATION FOR INVENTORIZING TRANSPONDERS BY MEANS OF SELECTABLE MEMORY AREAS OF THE TRANSPONDERS

(75) Inventors: Franz Amtmann, Graz (AT); Michael Cernusca, Judendorf-Strassengel (AT)

(73) Assignee: NXP B.V., Eindhoven (NL)

( * ) Notice: Subject to any disclaimer, the term of this patent is extended or adjusted under 35 U.S.C. 154(b) by 66 days.

(21) Appl. No.: 11/287,019

(22) Filed: Nov. 22, 2005

(65) Prior Publication Data

US 2006/0097851 A1 May 11, 2006

Related U.S. Application Data

(63) Continuation of application No. 10/317,571, filed on Dec. 12, 2002, now Pat. No. 6,995,651.

(30) Foreign Application Priority Data

Dec. 17, 2001 (EP) .................................. 01000760

(51) Int. Cl.
*H04Q 5/22* (2006.01)
(52) U.S. Cl. ............... 340/10.51; 340/10.41; 340/10.42; 340/572.1

(58) Field of Classification Search ................ 340/5.32, 340/5.31, 10.32, 572.1, 10.3, 10.1, 10.31, 340/10.4, 10.42, 10.51, 10.41
See application file for complete search history.

(56) References Cited

U.S. PATENT DOCUMENTS

| 4,656,463 | A | * | 4/1987 | Anders et al. | 340/10.42 |
|---|---|---|---|---|---|
| 5,499,017 | A | * | 3/1996 | Beigel | 340/572.1 |
| 5,532,686 | A | * | 7/1996 | Urbas et al. | 340/10.51 |
| 5,600,708 | A | * | 2/1997 | Meche et al. | 455/411 |
| 5,673,037 | A | * | 9/1997 | Cesar et al. | 340/10.32 |
| 5,889,941 | A | * | 3/1999 | Tushie et al. | 235/380 |
| 5,929,779 | A | * | 7/1999 | MacLellan et al. | 340/10.2 |
| 6,630,885 | B2 | * | 10/2003 | Hardman et al. | 340/505 |
| 2001/0037439 | A1 | * | 11/2001 | Ully | 711/220 |
| 2002/0118097 | A1 | * | 8/2002 | Heinrich et al. | 340/10.32 |
| 2002/0174153 | A1 | * | 11/2002 | O'Toole et al. | 340/10.1 |

* cited by examiner

*Primary Examiner*—Brian A Zimmerman
*Assistant Examiner*—Yong Hang Jiang

(57) ABSTRACT

A communication station (1) and a transponder (2) are designed in such a way that an inventorizing operation can be performed using various memory areas (36, 37, 38, 39, 40), which are provided in an addressable memory (35) of the transponder (2), and in which different identification data (UIDDATA, USERDATA) is stored.

24 Claims, 3 Drawing Sheets

COMMUNICATION STATION FOR INVENTORIZING TRANSPONDERS BY MEANS OF SELECTABLE MEMORY AREAS OF THE TRANSPONDERS

CROSS RELATED TO RELATED APPLICATIONS

This is a continuation of application Ser. No. 10/317,571, filed Dec. 12, 2002 now U.S. Pat. No. 6,995,651.

The invention relates to a communication station for contactless communication with transponders, which communication station comprises inventorizing means, which inventorizing means are designed for inventorizing transponders which are in communicative connection with the communication station, and which inventorizing means comprise inventorizing command generation means which are designed for generating an inventorizing command data block, by the evaluation of which in a transponder at least one memory area of a memory of the transponder can be found, in which at least one memory area identification data is stored and which at least one memory area influences the inventorizing of the transponder in that, in dependence on the at least one memory area, a transmission parameter is specified for transmitting a transmission signal that is to be transmitted from the transponder to the communication station for the purpose of inventorizing the transponder.

The invention further relates to a transponder for contactless communication with a communication station, which transponder comprises a memory, which memory comprises memory areas and in which memory first identification data assigned to the transponder and second identification data assigned to the transponder are each stored in at least one respective memory area.

The invention further relates to an integrated circuit for a transponder for contactless communication with a communication station, which integrated circuit comprises a memory, which memory comprises memory areas and in which memory first identification data assigned to the integrated circuit and second identification data assigned to the integrated circuit can each be stored in at least one respective memory area.

In the context of a communication station as described above and a transponder as described above and an integrated circuit as described above, reference may be made to the international standards of ISO 14443 and ISO 15693, for example, and to a transponder system put on the market by the applicant under the name I-Code1. Such a communication station and such a transponder and such an integrated circuit are thus known.

In each of the known embodiments, the fact is that an inventorizing operation for each transponder in communicative connection with the communication station is always executed using the same memory areas of these transponders and consequently always using a serial number stored in these memory areas and unique for the transponder concerned, i.e. a unique identification data block, which unique identification data block for all transponders is always stored in the same memory areas of a memory of the transponder and can thus always be found under the same address. For example, for the transponder system put on the market under the name I-Code1, the relevant unique serial numbers, i.e. the unique identification data blocks, are each stored in all transponders in two fixed preset memory areas of the memory of the transponder concerned.

The known solution does present a simple design, but there is the problem that an inventorizing operation can only be executed with the serial numbers stored in fixed preset memory areas of a memory in a transponder, i.e. with the unique identification data block. The consequence of this is that the inventorizing of transponders has only a limited flexibility, which represents an undesired restriction since more and more applications arise for transponders and their integrated circuits and for communication stations in which it is disadvantageous to execute an inventorizing operation with the help of the unique identification data blocks stored in fixed preset memory areas.

It is an object of the invention to remove the above restriction and the resulting disadvantages and to realize an improved communication station and an improved transponder and an improved integrated circuit.

To achieve the object described above, inventive features are provided for a communication station according to the invention, so that a communication station as in the invention can be characterized as follows:

Communication station for contactless communication with transponders, of which each transponder is designed for contactless communication with the communication station and each transponder comprises an addressable memory, which memory comprises memory areas each having an address, and in which memory first identification data assigned to the transponder and second identification data assigned to the transponder are each stored in at least one respective memory area; and which communication station comprises inventorizing means, which inventorizing means are designed for inventorizing transponders which are in communicative connection with the communication station and which inventorizing means comprise inventorizing command generation means which are designed for generating an inventorizing command data block, which block comprises a memory area selection data block by means of which in a transponder the at least one memory area of the memory can be found, in which at least one memory area identification data is stored, and which at least one memory area influences the inventorizing of the transponder in that, in dependence on the at least one memory area, a transmission parameter is specified for transmitting a transmission signal that is to be transmitted from the transponder to the communication station for inventorizing the transponder, wherein the inventorizing command generation means for generating at least one inventorizing command data block are designed with a memory area selection data block selectable from a set of memory area selection data blocks.

To achieve the object described above, inventive features are provided for a transponder according to the invention, so that a transponder as in the invention can be characterized as follows:

Transponder for contactless communication with a communication station, which communication station comprises inventorizing means for inventorizing the transponder in communicative connection with the communication station, and which transponder comprises an addressable memory, which memory comprises memory areas each with an address and in which memory first identification data assigned to the transponder and second identification data assigned to the transponder are each stored in at least one respective memory area, and which transponder comprises recognition means for recognizing at least one item of control information, which control information indicates which at least one storage area influences the inventorizing of the transponder, and which transponder comprises memory area selection means which interact with the recognition means and by means of which, in dependence on the control information recognized by the recognition means, the at least one memory area is selectable, in which at least one memory area identification data is stored, and which at least one memory area influences the inventorizing of the transponder in that, in dependence on the at least one memory area, a transmission parameter is specified for transmitting a transmission signal that is to be transmitted from the transponder to the communication station for the purpose of inventorizing the transponder.

To achieve the object described above, inventive features are provided for an integrated circuit according to the invention, so that an integrated circuit as in the invention can be characterized as follows:

Integrated circuit for a transponder for contactless communication with a communication station, which communication station comprises inventorizing means for inventorizing the integrated circuit in communicative connection with the communication station, which integrated circuit comprises an addressable memory, which memory comprises memory areas, each with an address, and in which memory first identification data assigned to the integrated circuit and second identification data assigned to the integrated circuit can each be stored in at least one respective memory area, and which integrated circuit comprises recognition means for recognizing at least one item of control information, which control information indicates which at least one storage area influences the inventorizing of the integrated circuit, and which integrated circuit comprises memory area selection means which interact with the recognition means and by means of which, in dependence on the control information recognized by the recognition means, the at least one memory area is selectable, in which at least one memory area identification data can be stored, and which at least one memory area influences the inventorizing of the integrated circuit in that, in dependence on the at least one memory area, a transmission parameter is specified for transmitting a transmission signal that is to be transmitted from the integrated circuit to the communication station for the purpose of inventorizing the integrated circuit.

The provision of the features as in the invention creates the possibility simply and at only slight additional cost, that with the help of a communication station designed according to the invention and transponders designed according to the invention and integrated circuits designed according to the invention, different inventorizing operations are optionally executable for such transponders according to the invention, the difference between the different inventorizing operations being that these inventorizing operations are executed using different selectable memory areas of the relevant memories provided in an addressable memory of a transponder or an integrated circuit, and possibly the identification data stored in these selectable memory areas. A simple method is made possible thereby for optionally executing an inventorizing operation using at least one selectable memory area, in which a unique serial number for a transponder or an integrated circuit, i.e. a unique identification data block of a transponder or an integrated circuit, is stored; or for optionally executing an inventorizing operation using at least one selectable memory area in which typical user data for a transponder, i.e. a characteristic user data block, is stored. This is especially advantageous because the unique identification data block is assigned by the manufacturer of the transponder or the integrated circuit for such a transponder during its manufacture and stored in the memory of the transponder or the integrated circuit, and because the characteristic user data block is stored by the user of the transponder or the transponder's integrated circuit in the memory of the transponder or the integrated circuit. This therefore advantageously creates the possibility of executing an inventorizing operation either using an identification data block assigned by a manufacturer, or using a user data block assigned by a user. It should be stressed here as especially advantageous that according to the inventorizing operation performed, i.e. depending on the selectable memory areas used for an inventorizing operation or on the identification data stored in these selectable memory areas (either unique identification data block or typical user data block), a transmission parameter selectable from several options for a transmission signal is chosen for the transmission of data from a transponder to a communication station, it being possible for this selectable transmission parameter to be formed, for example, from the starting time of several possible time windows or from the coding type used for coding data, or from the subcarrier frequency of a subcarrier signal for modulating a transmission signal.

Advantageous further embodiments of a communication station according to the invention and a transponder according to the invention and an integrated circuit according to the invention are characterized in the subclaims. The resulting advantages are further explained with reference to the embodiments described below.

The aspects cited above and further aspects of the invention will become apparent from the embodiments described below and are explained with reference to these embodiments.

The invention will be further described with reference to embodiments shown in the drawings to which, however, the invention is not restricted.

Figure 1:
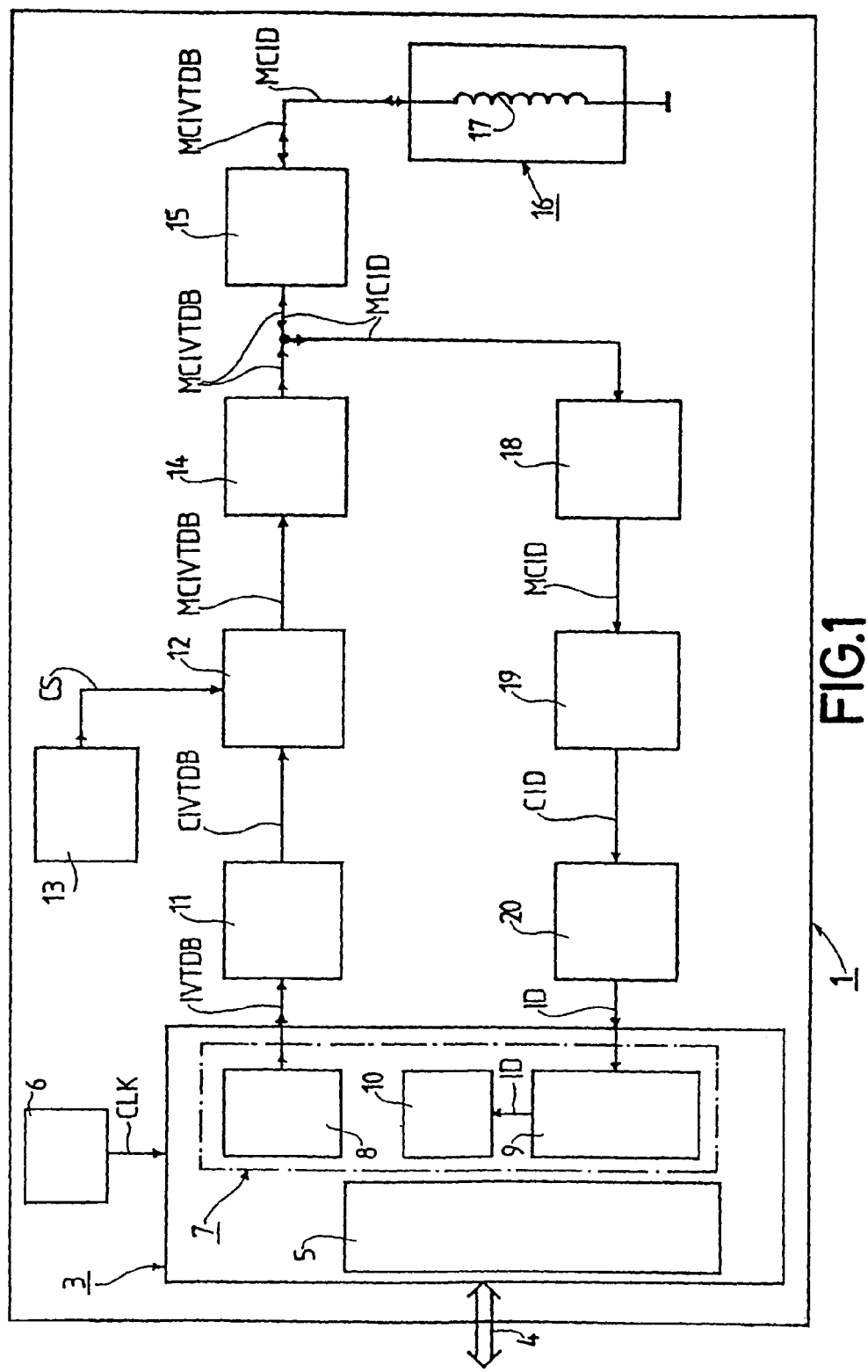
FIG. 1 shows schematically in the form of a block diagram an essential part in this context of a communication station according to an embodiment of the invention.
Figure 2:
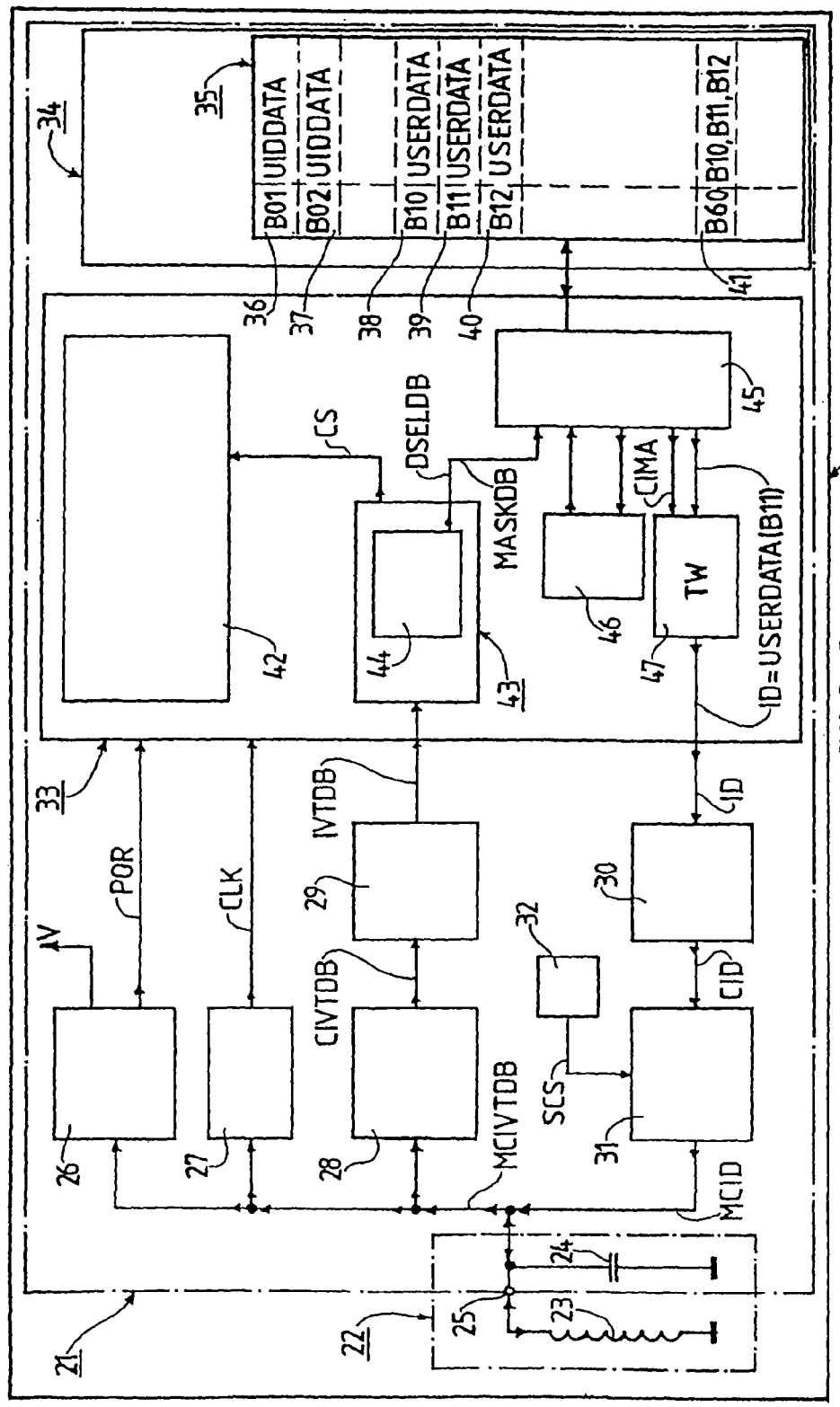
FIG. 2 shows schematically in the form of a block diagram an essential part in this context of a transponder and an integrated circuit for this transponder according to an embodiment of the invention.

FIG. 1 shows a communication station 1. Communication station 1 is provided and designed for contactless communication with transponders. FIG. 2 shows such a transponder 2. The design of the transponder 2 is subsequently dealt with in more detail.

The communication station 1 comprises a microcomputer 3. Instead of a microcomputer 3, however, a hard-wired logic circuit may alternatively be provided. A series of means and functions is implemented with the help of the microcomputer 3; only those means and functions that are important in this context are dealt with further here. The microcomputer 3 is connected via a data connection 4 to a host computer (not shown). The microcomputer 3 comprises sequence control means 5 which can be used for controlling a number of sequences, in particular program flows. The microcomputer 3 is connected to a timing signal generator 6 with which a timing signal CLK can be generated, this timing signal CLK being fed to the microcomputer 3 for known purposes.

By means of the microcomputer 3, inventorizing means 7 are realized. The inventorizing means 7 are designed for inventorizing transponders 2 that are in communicative connection with the communication station 1. Inventorizing should be understood to mean that the communication station 1 receives a transmission signal uniquely and unmistakably from each transponder 2 in communicative connection with communication station 1, and each transponder 2 is thus uniquely recognized, and that for each recognized transponder 2 the received transmission signal, and thus preferably characteristic or typical identification data, is available in the communication station 1. The inventorizing means 7 in this case comprise inventorizing command generation means 8 and identification data recognition means 9 and identification data processing means 10.

Figure 3:
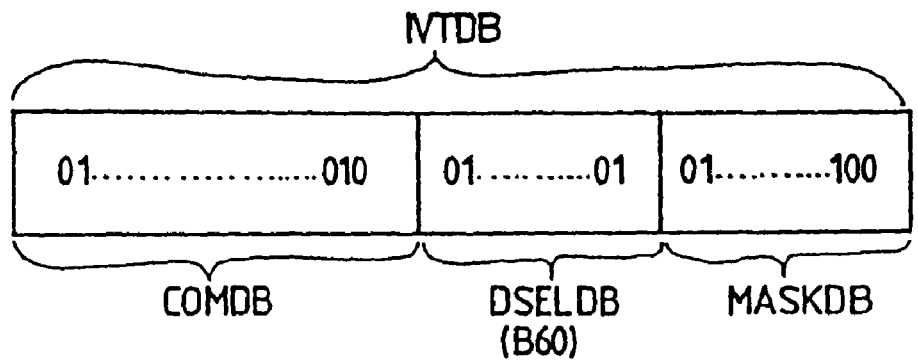
FIG. 3 shows schematically an inventorizing command data block which can be generated with the communication station according to FIG. 1 and processed with the transponder according to FIG. 2.

The inventorizing command generation means 8 are developed for generating an inventorizing command data block IVTDB. Such an inventorizing command data block IVTDB is shown in FIG. 3. The inventorizing command data block IVTDB comprises a command data block COMDB and a memory area selection data block DSELDB and a mask data block MASKDB. The command data block COMDB notifies all transponders 2 in communicative connection with the communication station 1, i.e. in a communication area of communication station 1 that these transponders 2 should be inventorized. The memory area selection data block DSELDB provides the transponders 2 in communicative connection with the communication station 1 with a control information item, by means of which in a transponder 2 at least one memory area of a memory of the transponder 2 can be found, in which at least one memory area identification data is stored and which at least one memory area influences the inventorizing of the transponder 2.

The communication station 1 of FIG. 1 is advantageously designed such that the inventorizing command generation means 8 are designed to generate an inventorizing command data block IVTDB, which inventorizing command data block IVTDB comprises a memory area selection data block DSELDB selectable from a set of memory area selection data blocks. In the transponder systems known so far, no such memory area selection data block DSELDB selectable from a set of possible memory area selection data blocks was or is included in an inventorizing command data block IVTDB, as this was or is not necessary, because in the transponder systems known so far, only preset memory areas or the contents stored in these preset memory areas, i.e. identification data, were ever used for inventorizing purposes. According to the selection option mentioned above, the inventorizing command generation means 8 are designed for generating an inventorizing command data block IVTDB as in FIG. 3 with a memory area selection data block DSELDB selectable from a set of memory area selection data blocks, the memory area selection data block DSELDB containing the address B60 of an address data memory area of the memory of a transponder, in which address data memory area at least one address of at least one memory area of the memory of a transponder 2 is stored, in which at least one memory area identification data is stored and which at least one memory area influences the inventorizing of the transponder 2.

In relation to the selection of a memory area selection data block DSELDB selectable from a set of memory area selection data blocks, it should also be stressed that such a selection may be made in the communication station 1 by inputting a corresponding control information item from a host computer connected to communication station 1 via the data connection 4. Such a selection may alternatively be made by inputting corresponding control information with the help of control keys provided on the communication station 1.

The mask data block MASKDB notifies each transponder 2 which part of the identification data stored in the memory of transponder 2, i.e. for example of the unique identification data block or of several typical user data blocks for a user of a transponder 2, is to be used for executing an inventorizing operation. This mask data block MASKDB may also be used for other purposes, for example the mask data block MASKDB may be used in a so-called time slot inventorizing process for codetermination of the time slot in which a transponder 2 transmits its transmission signal in reply to the communication station 1. However, the measures according to the invention may be used advantageously not only in a time slot inventorizing process, but also in other inventorizing processes, in which, for example, a so-called bitwise comparison or check of identification data is performed.

The output from the inventorizing command generation means 8 is input to encoding means 11, by means of which an input inventorizing command data block IVTDB is subjected to encoding. After the encoding, the encoding means 11 output a coded inventorizing command data block CIVTDB. The output from encoding means 11 is input to modulation means 12, to which the coded inventorizing command data block CIVTDB can be fed, and to which a carrier signal CS generated by a carrier signal generator 13 can additionally be fed. By means of the modulation means 12, the applied carrier signal CS can be modulated in dependence on the similarly applied coded inventorizing command data block CIVTDB, so that after the modulation the modulation means 12 output a modulated coded inventorizing command data block MCIVTDB. The output from modulation means 12 is input to amplifying means 14 which amplify the modulated coded inventorizing command data block MCIVTDB. The output from amplifying means 14 is input to matching means 15, and from there to transmission means 16, which comprise a transmission coil 17 and are effective as means of both sending and receiving. A modulated coded inventorizing command data block MCIVTDB amplified by the amplifying means 14 is fed via the matching means 15 to the transmission means 16 for the purpose of transmission to all transponders 2 present in a communication area of the communication station 1 as in FIG. 2.

The circuit parts described so far serve for transmitting signals from the communication station 1 to the transponder 2 as in FIG. 2. Means are also provided in the communication station 1 which are effective for a transmission of a transmission signal from a transponder 2 as in FIG. 2 to the communication station 1. These means also include the transmission means 16 and the matching means 15.

Also among these means are filter means 18, which are connected to the matching means 15, and to which modulated coded identification data MCID can be fed as well as other signals not described in detail here. The output from the filter means 18 is input to demodulation means 19, the output from the latter then being input to decoding means 20. After a particular received signal has been filtered by the filter means 18, it is demodulated by the demodulation means 19 and subsequently decoded by the decoding means 20, so that in the case of modulated coded identification data MCID transmitted to the communication station 1, the coded identification data CID appears after demodulation means 19 and the identification data ID after decoding means 20.

The output from decoding means 20 is input to the identification data recognition means 9. The identification data recognition means 9 can recognize the identification data ID transmitted in the form of a transmission signal with a certain transmission parameter to the communication station 1 if the identification data of only one single transponder 2 is received in the communication station 1 according to a transmission parameter. However, the identification data recognition means 9 can also recognize when the identification data of two or more transponders 2 were received in the communication station 1 according to a transmission parameter, i.e. when a so-called collision has occurred, after which at least one further inventorizing operation must then be performed. After a clear recognition of recognized identification data ID, the recognized identification data ID is fed to the identification data processing means 10, which identification data processing means 10 process the recognized identification data ID. For example, the recognized identification data ID may be stored in a memory of the microcomputer 3. The recognized identification data ID may alternatively be passed on via the data connection 4 to the host computer (not shown). The recognized identification data ID may furthermore be forwarded to acknowledgement signal generation means, which acknowledgement signal generation means then provide for the generation of an acknowledgement signal which is transmitted to the transponder 2 that was inventorized during a completed inventorizing operation, i.e. was uniquely recognized.

The transponder 2 will now be described with reference to FIG. 2. The transponder 2 is designed for contactless communication with the communication station 1 as in FIG. 1. The transponder 2 in this case is a transponder 2 which is connected to a product and in which data concerning the product is stored, for example data about the product type, the sales price, the date of manufacture, the country of manufacture, an expiry date, and similar characteristics, as well as a serial number unique for each transponder 2 and thus significant, i.e. a characteristic identification data block. The stored data may, for example, correspond to the so-called EPC code ((Electronic Product Code) or the so-called EAN code. The EPC code is a data word of ninety-six (96) bits in all, with which every product in the world can be significantly and distinguishably labeled. However, the transponder 2 may alternatively be provided and developed for other application purposes.

The transponder 2 comprises an integrated circuit 21. The transponder 2 further comprises transmission means 22. The transmission means 22 consist of a transmission coil 23, which is provided outside the integrated circuit 21, and a capacitor 24, which is implemented within the integrated circuit 21. The transmission coil 23 is connected to a terminal contact 25 of the integrated circuit 21. The transmission coil 23 and capacitor 24 form a resonant circuit, whose resonant frequency corresponds to an operating frequency of at least one signal to be transmitted from the communication station 1 to the transponder 2, though this need not necessarily be so. A signal to be transmitted to the transponder 2 in this case is an amplitude-modulated carrier signal, for example the modulated coded inventorizing command data block MCIVTDB. But it may also be a different transmission signal.

The transmission means 22, which form receiving means, are provided and developed for receiving an inventorizing command data block IVTDB, this inventorizing command data block IVTDB being contained in the amplitude-modulated and coded inventorizing command data block MCIVTDB. The amplitude-modulated and coded inventorizing command data block MCIVTDB can be generated with the communication station 1 as in FIG. 1, and can be transmitted contactlessly to the transponder 2 by means of a field produced by the communication station 1 and influencing the transponder 2. The transmission is made in this case by inductive means, i.e. by transformer. However, the transmission may alternatively be executed by electromagnetic means. With the inventorizing command data block UVTB, notification goes to the transponder 2 or a number of transponders 2 present in a communication area of the communication station 1, that the transponder(s) 2 have to take part in an inventorizing operation.

The transponder 2 or the integrated circuit 21 comprises an energy supply circuit 26 and a clock recovery stage 27 and a demodulation stage 28. The energy supply circuit 26 and the clock recovery stage 27 and the demodulation stage 28 are each connected to the terminal contact 25, with the result that these circuit elements are each supplied with the signal received with the transponder 2, thus also with the amplitude-modulated coded inventorizing command data block MCIVTDB received with the transponder 2.

The energy supply circuit 26 is provided and developed for generating a direct supply voltage V using the signal fed to it, as has long been known. The energy supply circuit 26 is also provided and developed for generating a so-called "Power on Reset" signal POR, which signal POR is generated if the transponder 2 is supplied with sufficient energy and consequently a sufficiently high direct supply voltage V is generated by the energy supply circuit 26.

The clock signal recovery stage 27 is provided and developed for restoring a clock signal CLK, using the signal fed to it, such as the amplitude-modulated coded inventorizing command data block MCIVTDB. This measure, too, has long been known.

The demodulation stage 28 is provided and designed for demodulating the amplitude-modulated coded inventorizing command data block MCIVTDB. The amplitude-modulated coded inventorizing command data block MCIVTDB can be fed to the demodulation stage 28, with the result that the demodulation stage 28 generates and outputs a demodulated coded inventorizing command data block CUVTDB. The output from demodulation stage 28 is input to a decoding stage 29, to which the coded inventorizing command data block CIVTDB can be fed and by which this still-encoded data block is decoded. The encoding of this data block was executed previously in the communication station 1. After the decoding, the decoding stage 29 outputs the inventorizing command data block IVTDB.

The means described so far take effect in a receive mode of the transponder 2. But with the transponder 2 it is also possible to execute a send mode or a transmit mode from the transponder 2 to the communication station 1. For this the transponder 2 or the integrated circuit 21 comprises an encoding stage 30 and a modulation stage 31 following the encoding stage 30, and a subcarrier signal generator 32 which is connected to the modulation; stage 31. The modulation stage 31 is connected on the output side to the terminal contact 25 and thus to the transmission means 22, which also form sending means. Various signals can be fed to the encoding stage 30, including identification data ID, the origin of which is dealt with in detail later. The encoding stage 30 enables encoding of the identification data ID, after which encoding the encoding stage 30 outputs coded identification data CID. The coded identification data CID can be fed to the modulation stage 31. A subcarrier signal SCS generated by the subcarrier signal generator 32 can also be fed to the modulation stage 31. Using the subcarrier signal SCS, the modulation stage 31 performs an amplitude modulation of the coded identification data CID, so that the modulation stage 31 supplies transmission means 22 with identification data MCID modulated in respect of amplitude and furthermore coded, which transmission means 22 provide for a transmission to the communication station 1. Instead of an amplitude modulation, however, a phase modulation or a frequency modulation may also be performed.

The transponder 2 or the integrated circuit 21 of the transponder 2 comprises a microcomputer 33. Instead of the microcomputer 33, however, a hard-wired logic circuit may also be provided. The "Power on Reset" signal POR and the clock signal CLK as well as the inventorizing command data block IVTDB can be fed to the microcomputer 33, and the microcomputer 33 outputs the identification data ID.

The microcomputer 33 co-operates with storage means 34, which comprise a RAM and a ROM or an EEPROM, but this, too, has long been known. The storage means 34 comprise an addressable memory 35. The addressable memory 35 comprises a number of memory areas, of which a few memory areas are marked in FIG. 2 with the reference numerals 36, 37, 38, 39, 40 and 41. The memory area 41 is a so-called address data memory area. Each memory area possesses an address. In FIG. 2 the addresses for the memory areas 36 to 41 are specified, namely the addresses B01, B02, B10, B11, B12, and B60.

In the addressable memory 35, first identification data ID assigned to the transponder 2 is stored (or can be stored) in the two memory areas 36 and 37 with the addresses B01 and B02. This first identification data ID involves the so-called serial number, a characteristic unique identification data block UIDDATA for the transponder 2. In the addressable memory 35, second identification data ID assigned to the transponder 2 is stored (or can be stored) in the memory areas 38, 39 and 40. This second identification data ID involves a typical user data block USERDATA for a user of the transponder 2. In this case, the three addresses B10, B11 and B12 of the memory areas 38, 39 and 40 are stored in the addressable memory 35, in the address data memory area 41 having the address B60. The reason is that in the case assumed here the three memory areas 38, 39 and 40 with the addresses B10, B11 and B12 influence the inventorizing of the transponder 2, and for this the second identification data ID stored in the three memory areas 38, 39 and 40 with the addresses B10, B11 and B12, i.e. the user data block USERDATA, can be read for the purpose of inventorizing the transponder 2; this will be dealt with in detail later.

The microcomputer 33 comprises sequence control means 42, which can be used for controlling a number of sequences, in particular program flows.

By means of the microcomputer 33, recognition means 43 for recognition of inventorizing command data blocks UVTDB are furthermore implemented. The inventorizing command data blocks IVTDB output by the decoding stage 29 can be fed to the recognition means 43. The recognition means 43 can recognize the command data block COMDB in each inventorizing command data block IVTDB. After a recognition of such a command data block COMDB, the recognition means 43 output a control signal CS, which is fed to the sequence control means 42, with the result that the sequence control means 42 control a program flow in the microcomputer 33 that is necessary for executing an inventorizing operation.

The recognition means 43 comprise further recognition means 44, these further recognition means 44 being provided and developed for recognizing control information, this control information indicating which at least one memory area influences the inventorizing of the transponder 2 and from which at least one memory area the identification data ID stored therein can be read for the purpose of inventorizing the transponder 2. In the case described here, the control information is formed by the memory area selection data block DSELDB, which is contained in an inventorizing command data block IVTDB (see FIG. 3). The further recognition means 44 can recognize such a memory area selection data block DSELDB and output the recognized memory area selection data block DSELDB after a recognition of such a memory area selection data block DSELDB. In this present case the further recognition means 44 are thus designed to recognize the memory area selection data block DSELDB selected from a set of memory area selection data blocks, which memory area selection data block DSELDB forms an item of control information.

The microcomputer 33 also serves to implement memory area selection means 45 which co-operate with the further recognition means 44 and which, in dependence on the control information recognized by means of the further recognition means 44, i.e. in dependence on the memory area selection data block DSELDB recognized by the further recognition means 44, can select the memory area in which at least one memory area identification data is stored and from which the identification data ID stored therein can be read for the purpose of inventorizing the transponder 2, and which at least one memory area influences the inventorizing of the transponder 2 in that, in dependence on the at least one memory area, a transmission parameter is specified for transmitting a transmission signal that is to be transmitted from the transponder 2 to the communication station 1 for inventorizing the transponder 2. In this present case the memory area selection data block DSELDB contains the address B60 of the address data memory area 41 of the addressable memory 35 of the transponder 2, in which address data memory area 41 the three addresses B 10, B 1, and B 12 of the three memory areas 38, 39, and 40 of the memory 35 of the transponder 2 are stored, from which three memory areas 38, 39, and 40 the identification data ID stored therein, i.e. the user data block USERDATA, can be read for the purpose of inventorizing the transponder 2. When the memory area selection means 45 receive the memory area selection data block DSELDB from the further recognition means 44, the memory area selection means 45 provide for a reading of the data stored in the address data memory area 41, i.e. for a reading of the addresses B10, B11, and B12.

The microcomputer 33 also serves to implement data processing means 46 which co-operate with the memory area selection means 45 and are provided and designed for processing the data read from the address data memory area 41, i.e. for processing the addresses B10, B11 and B12. The data read from the address data memory area 41 by the memory area selection means 45, i.e. the addresses B10, B11 and B12, is fed to the data processing means 46, after which the data processing means 46 forward the addresses B10, B11 and B12 to the memory area selection means 45, with the result that the memory area selection means 45 provide for a reading of the second identification data ID stored in the memory areas 38, 39 and 40 with addresses B10, B11 and B12, i.e. the user data block USERDATA. The user data block USERDATA read from the memory areas 38, 39 and 40 is fed to the memory area selection means 45, and subsequently the part of the user data block USERDATA that is to be transmitted as identification data ID to the communication station 1 for inventorizing the transponder 2 is determined using the mask data block MASKDB contained in an inventorizing command data block IVTDB, which mask data block MASKDB was recognized by the recognition means 43 and fed to the memory area selection means 45. In this present case it is assumed that from the entire second identification data ID, i.e. the user data block USERDATA, only the second identification data ID stored in the memory area 39 with the address B11, i.e. the part of the user data block USERDATA(B11), is to be used for inventorizing the transponder 2. As a result, the memory area selection means 45 selects only the part of the user data block USERDATA(B11) stored in the memory area 39 with the address B11 and subsequently feeds it to the encoding stage 30 as identification data ID; this will be dealt with in detail later.

The transponder 2 or the integrated circuit 21 of the transponder 2 comprises transmission parameter determination means 47 following the memory area selection means 45, which transmission parameter determination means 47 are formed in the present case by time window determination means 47. The time window determination means 47 are formed by means of the microcomputer 33. The identification data ID selected by the memory area selection means 45, i.e. the part of the user data block USERDATA(B11) from the memory area 39 stored with the address B11, can be fed to the time window determination means 47. Furthermore, an item of control information CIMA can be fed to the time window determination means 47 from the memory area selection means 45, which item CIMA indicates from which memory area the identification data ID fed to the time window determination means 47 originates. The control information CIMA fed to the time window determination means 47 thus provide the latter with information referencing the memory area of memory 35 from which the identification data ID comes, which is to be processed in each case. This identification data ID may be the characteristic unique identification data block UIDDATA for the transponder 2, or the typical user data block USERDATA for a user of the transponder 2, or parts of these data blocks. Using the control information CIMA, the time window determination means 47 process a preset algorithm to determine a time window, in which time window the identification data ID fed to the time window determination means 47, i.e. the part of the user data block USERDATA(B11), is forwarded to the encoding stage 30. The time window determination means 47 are developed in this case to define a total of sixty-four (64) time windows TW beginning at sixty-four (64) different starting times, as is symbolically specified in FIG. 2. However, a different number of time windows beginning at different times may alternatively be selected. For example, thirty-two (32) or one hundred and twenty-eight (128) or two hundred and fifty-six (256), but also a number that is not a multiple of two (2). The part of the user data block USERDATA(B11) selected and forwarded in a specific time window TW by the time window determination means 47 and forming the identification data ID selected for inventorizing purposes is then encoded by the encoding stage 30 and subsequently modulated by the modulation stage 31, after which a transmission from the transponder 2 to the communication station 1 can take place.

After a transmission of the selected identification data ID from the transponder 2 to the communication station 1, an inventorizing operation can be performed in the communication station 1 in known manner.

In the transponder system formed from the communication station 1 as in FIG. 1 and transponders 2 as in FIG. 2, the essential advantage is gained that the identification data ID used for an inventorizing operation can be defined or found with the help of address data B10, B11, and B12 stored in an address data memory area 41, which offers the great advantage that it is easily possible to change the identification data ID used for an inventorizing operation by changing the address data stored in the address data memory area 41. This address data stored or storable in the address data memory area 41 may be changed, for example, contactlessly using the transmission means 22 of the transponder 2. For example, changing the address data B10, B11 and B12 stored in the address data memory area 41 with the address B60 to the address B01 and B02 is a simple way of causing the identification data block UIDDATA to be used instead of the user data block USERDATA for inventorizing purposes. The memory content in the address data memory area 41 with the address B60 may also be changed in such a way that instead of the addresses B10, B11, and B12, only the address B10 or only the address B11 or only the address B12 or only the addresses B10 and B11 and or only the addresses B10 and B12 or also an address additional to the addresses B10, B11, and B12 are stored. It should be mentioned that in the case of indirect addressing as explained above, instead of an address of an address data memory area transmitted from a communication station to a transponder, a fixed preset address in a transponder for such an address data memory area may also be provided.

Figure 4:
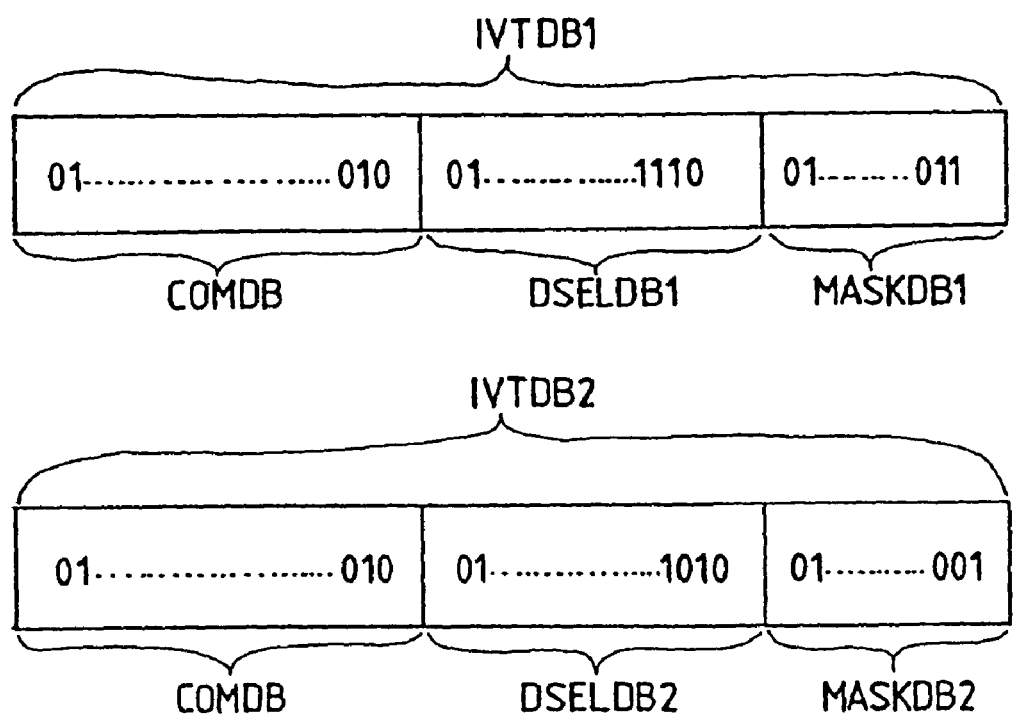
FIG. 4 shows two different inventorizing command data blocks which can be generated with a communication station (not shown) according to a further embodiment of the invention and can be processed with a transponder (not shown) according to a further embodiment of the invention.

In the transponder system formed from the communication station 1 as in FIG. 1 and transponders 2 as in FIG. 2, indirect addressing is performed by the address data memory area 41 of those memory areas 38, 39, and 40 from which the stored identification data, i.e. the user data block USERDATA forming the second identification data, can be read for the purpose of inventorizing a transponder 2. In a different transponder system with a communication system (not shown) and a transponder (not shown), a solution is provided in which a direct addressing occurs of those memory areas which influence the inventorizing of the transponder and from which the identification data stored in these memory areas can be read for the purpose of inventorizing the transponder. In this transponder system, the unrepresented communication station comprises inventorizing command generation means which are developed to generate two different inventorizing command data blocks IVTDB1 and IVTDB2, which different inventorizing command data blocks IVTDB1 and UVTDB2 are schematically represented in FIG. 4. The two different inventorizing command data blocks IVTDB1 and IVTDB2 each comprise the same command data block COMDB. Each of the two inventorizing command data blocks IVTDB1 and IVTDB2 comprises a memory area selection data block, DSELDB1 or DSELDB2, respectively, selectable from a set of memory area selection data blocks. These two memory area selection data blocks DSELDB1 and DSELDB2 are differently configured. The first memory area selection data block DSELDB1 contains at least one address of at least one memory area of the memory of the unrepresented transponder, in which at least one memory area the first identification data, i.e. the identification data block UIDDATA, of the relevant transponder is stored. The second memory area selection data block DSELDB2 contains at least one address of at least one memory area of the memory of the unrepresented transponder, in which at least one memory area the second identification data, i.e. the user data block USERDATA, is stored.

In this case the recognition means of the unrepresented transponder 2, which correspond to the further recognition means 44 of the transponder 2 as in FIG. 2, are designed to recognize two different memory area selection data blocks DSELDB1 and DSELDB2, respectively, which are selectable from a set of memory area selection data blocks. If the unrepresented communication station 1 sends a first inventorizing command data block IVTDB1 to the unrepresented transponder 2, the identification data block UIDDATA stored in the addressable memory of this transponder and forming the first identification data is consequently read for inventorizing purposes and transmitted as transmission signal to the communication station, a transmission parameter (preferably the starting time of time windows) being specified in dependence on the memory area from which the first identification data is read. On the other hand, if the unrepresented communication station sends a second inventorizing data block IVTDB2 with the second memory area selection data block DSELDB2 to the unrepresented transponder 2, the user data block USERDATA stored in the memory of this transponder and forming the second identification data is consequently read for inventorizing purposes and transmitted as transmission signal to the communication station, a transmission parameter (preferably the starting time of time windows) being specified in dependence on the memory area from which the second identification data is read. This transponder system thus also provides a simple method of utilizing different memory areas, or different identification data stored in the different memory areas, for inventorizing purposes, it being possible to call or find the different memory areas or identification data with the help of different inventorizing data blocks, IVTDB1 or IVTDB2.

It should also be mentioned that the different inventorizing data blocks IVTDB1 and IVTDB2 also contain different mask data blocks MASKDB1 and MASKDB2, so that in each case different parts of the different identification data can be utilized for inventorizing purposes.

In a transponder system with a communication station according to the invention and with transponders according to the invention, it is easily possible to utilize two different memory areas of an addressable memory, or the first or second identification data they contain, for inventorizing purposes. Here the first identification data may be formed by a unique identification data block UIDDATA and the second identification data by a typical user data block USERDATA. However, there is also the possibility that the first identification data is formed by a first part of a unique identification data block UIDDATA and the second identification data is formed by a second part of the same unique identification data block UIDDATA. It is furthermore possible that the first identification data is formed by a first part of a typical user data block USERDATA and the second identification data by a second part of the same typical user data block USERDATA.

It may further be mentioned that it is also possible to feed control information to a transponder according to the invention, this control information indicating which at least one memory area should influence the inventorizing of the transponder, in which case the identification data stored therein are to be read for the purpose of inventorizing the transponder, and this control information contains additional information which decides which part of the identification data to be read for the purpose of inventorizing a transponder should be used for an inventorizing run. This additional information provides a simple method of utilizing differently sized parts of stored identification data for the purpose of inventorizing a transponder, the size of the parts to be used being governed by the application of the transponders; for example such that in the event that only a relatively small number of transponders is to be inventorized, only a relatively small part of stored identification data is used for inventorizing, whereas if a relatively large number of transponders is to be inventorized, a relatively large part of stored identification data is used for inventorizing. Such additional information may be formed by a mask having a mask value and a mask length, but also by a so-called hash value.

In the above embodiments of communication stations according to the invention and transponders according to the invention, control information for the purpose of defining or selecting the memory areas which should influence the inventorizing of the transponder and from which identification data should be read for inventorizing purposes, is transmitted from a communication station in the form of data blocks to the relevant transponders. However, it is alternatively possible to store such control information directly in a memory of a transponder or the integrated circuit of a transponder, for example as a flag, which can be programmed either by the manufacturer of the transponder during manufacture, or by the user. Such control information may also be implemented in the integrated circuit during manufacture of the integrated circuit for a transponder, by realizing a specific development of the so-called metal mask, or an integrated fuse.

As a transmission parameter for the transmission of a transmission signal to be transmitted from the transponder to the communication station, when an inventorizing operation is performed with the communication stations and transponders described above according to the invention, the respective starting time of time windows is specified by time window determination means in dependence on the selected memory area from which identification data is or was read for inventorizing a transponder. In alternative embodiments, however, depending on the selected memory area that influences the inventorizing of the transponder by specifying a transmission parameter in dependence on the selected memory area, the encoding type for the transmission signal or a subcarrier signal for modulating the transmission signal may also be brought in as a transmission parameter.

In the communication stations and transponders according to the embodiments described above, the selected memory areas are used for specifying a transmission parameter for a transmission signal to be transmitted from a transponder to a communication station in an inventorizing operation, and in addition the identification data stored in these memory areas is transmitted in part to the communication station. This need not necessarily be so, as it is also possible to utilize the selected memory areas or the identification data stored in these memory areas only to specify the transmission parameter, but not to use the stored identification data or part of it as a transmission signal for inventorizing purposes, using other data stored in an addressable memory of a transponder instead.

In the transponders described with reference to FIG. 2, the storage means 34 comprise a memory 35 that is realized as one storage unit. However, such a memory 35 may alternatively comprise several storage levels implemented as separate units, the memory areas addressed with the addresses B01 and B02 being implemented, for example, with one storage level, and the memory areas addressed with the addresses B10, B11, and B12 being implemented with another storage level. Here the memory areas with the addresses B01 and B02 may be formed, for example, by a so-called metal mask, which then forms a storage level.

The invention claimed is:

1. A communication station for contactless communication with a plurality of transponders, the communication station comprising:
   inventorizing command generation means to initiate an inventorizing operation to uniquely identify at least one transponder of the plurality of transponders, wherein the inventorizing operation corresponds to control information which includes an inventorizing command data block (IVTDB) comprising:
      a memory area selection data block (DSELDB) which identifies a selectable address data memory area of at least two selectable address data memory areas on an addressable memory on the at least one transponder;
      wherein a first address data memory area of the at least two selectable address data memory areas corresponds to a unique identification data block (UID-DATA) which is assigned by a manufacturer of the at least one transponder and uniquely identifies the at least one transponder; and
      wherein a second address data memory area of the at least two selectable address data memory areas corresponds to a typical user data block (USERDATA)

that is different from the unique identification data block and which is assigned by a user of the at least one transponder and uniquely identifies the at least one transponder;

modulation means coupled to the inventorizing command generation means, the modulation means to provide a modulation output in connection with the control information; and transmission means coupled to the modulation means, the transmission means to transmit a signal in connection with the modulation output.

2. A communication station as claimed in claim 1, wherein the memory area selection data block is selectable from among a set of memory area selection data blocks corresponding to the selectable address data memory areas.

3. A communication station as claimed in claim 1, wherein the control information comprises a mask data block, the mask data block signaling which one or more parts of the unique identification data block and/or the typical user data block are selected for use in executing the inventorizing operation.

4. A communication station as claimed in claim 3, further comprising receiving means, the receiving means providing for receiving at least one inventorizing signal, the inventorizing signal being responsive to a transmission parameter signaled, at least in part, via the mask data block.

5. A communication station as claimed in claim 1, further comprising receiving means, the receiving means providing for receiving at least one inventorizing signal, the inventorizing signal being representative, at least in part, of the selected unique identification data block and/or the typical user data block.

6. A communication station as claimed in claim 5, wherein the receiving means provides for receiving the at least one inventorizing signal responsive to a transmission parameter, the transmission parameter being signaled, at least in part, via the control information.

7. A communication station as claimed in claim 1, further comprising receiving means, the receiving means providing for receiving at least one inventorizing signal, the inventorizing signal being responsive to a transmission parameter, the transmission parameter being signaled, at least in part, via the control information.

8. A communication station as claimed in claim 7, wherein the control information signals the transmission parameter in relation to at least one of (a) at least one address of the addressable memory and (b) one or more parts, or all, of at least the selected unique identification data block and/or the typical user data block.

9. A communication station as claimed in claim 1, wherein the control information signals some or all of the plurality of transponders for inventorizing in the inventorizing operation.

10. A transponder enabled to support inventorization, comprising:

control logic;

a transceiver coupled to the control logic; and an addressable memory coupled to the control logic, wherein the addressable memory comprises:

a first memory area to store a unique identification data block (UIDDATA) which is assigned by a manufacturer of the transponder to uniquely identify the transponder; and a second memory area to store a typical user data block (USERDATA) that is different from the unique identification data block and which is assigned by a user of the transponder to uniquely identify the transponder;

wherein the control logic is configured to send the unique identification data block and/or the typical user data block to a communication station in response to an inventorizing operation initiated by the communication station, wherein the inventorizing operation corresponds to control information which includes an inventorizing command data block (IVTDB) comprising a memory area selection data block (DSELDB) which identifies the first or second memory area of the addressable memory on the transponder.

11. The transponder of claim 10, wherein the transceiver is enabled to receive the control information and, depending at least in part on the control information, the control logic is enabled to retrieve the unique identification data block from the first memory area, the typical user data block from the second memory area, or a memory address of the second memory area from an address data memory area.

12. The transponder of claim 11, wherein the control logic is enabled to retrieve the typical user data block from the second memory area based on the memory address of the second memory area from the address data memory area.

13. The transponder of claim 11, wherein the control logic, depending at least in part on the control information, is enabled to select among one or more of the unique identification data block, the typical user data block, and the memory address of the second memory area, or parts thereof, and the transceiver is enabled to transmit an inventorizing signal representative of the so-selected identification data.

14. The transponder of claim 11, wherein the transceiver is enabled to transmit an inventorizing signal depending on some or all of the unique identification data block, the typical user data block, and the memory address of the second memory area.

15. The transponder of claim 11, wherein the transceiver is enabled to transmit an inventorizing signal in accordance with a transmission parameter, the transmission parameter depending at least in part on the control information.

16. The transponder of claim 15, wherein the transmission parameter comprises at least one of a starting time of time windows, a number of time windows, an encoding type for the transmission signal, or a subcarrier signal for modulating the transmission signal.

17. The transponder of claim 15, wherein the transmission parameter depends, at least in part, on at least one of (a) at least one addressing associated with at least one of the first memory area, the second memory area, and the address data memory area, and (b) one or more parts, or all, of the unique identification data block, the typical user data block, and the memory address of the second memory area.

18. The transponder of claim 11, wherein the transceiver is enabled to transmit an inventorizing signal exclusive of retrieved identification data.

19. The transponder of claim 11, wherein the control logic retrieves at least one of the unique identification data block from the first memory area and the typical user data block from the second memory area, exclusive of retrieval of the memory address of the second memory area from the address data memory area.

20. An integrated circuit, comprising:

a transceiver circuit adapted to be coupled to a coil disposed external to the integrated circuit;

control logic coupled to the transceiver circuit;

an addressable memory coupled to the control logic, wherein the addressable memory comprises:

a first memory area to store a unique identification data block (UIDDATA) which is assigned by a manufacturer of the transponder to uniquely identify the transponder; and a second memory area to store a typical user data block (USERDATA) that is different from the unique identification data block and which is assigned by a user of the transponder to uniquely identify the transponder;

wherein the control logic is configured to send the unique identification data block and/or the typical user data block to a communication station in response to an inventorizing operation initiated by the communication station, wherein the inventorizing operation corresponds to control information which includes an inventorizing command data block (IVTDB) comprising a memory area selection data block (DSELDB) which identifies the first or second memory area of the addressable memory on the transponder.

21. The integrated circuit of claim 20, wherein the control logic is enabled to retrieve at least one of the unique identification data block from the first memory area, the typical user data block from the second memory area, or a memory address of the second memory area from an address data memory area.

22. The integrated circuit of claim 21, wherein the control logic is enabled to retrieve the typical user data block from the second memory area based on the memory address of the second memory area from the address data memory area.

23. The integrated circuit of claim 21, wherein the control logic is enabled to select among one or more of the unique identification data block from the first memory area, the typical user data block from the second memory area, and the memory address of the second memory area from the address data memory area, or parts thereof 24. The integrated circuit of claim 20, wherein at least one of the control logic and transceiver is enabled to formulate a transmission parameter responsive to at least one of (a) at least one addressing associated with at least one of the first memory area, the second memory area, and an address data memory area, and (b) one or more parts, or all, of the unique identification data block, the typical user data block, and the memory address of the second memory area.

* * * * *